Nov. 22, 1949  J. J. PESTA  2,489,105
COMBINATION LOVE SEAT AND BED
Filed April 25, 1945  5 Sheets-Sheet 1
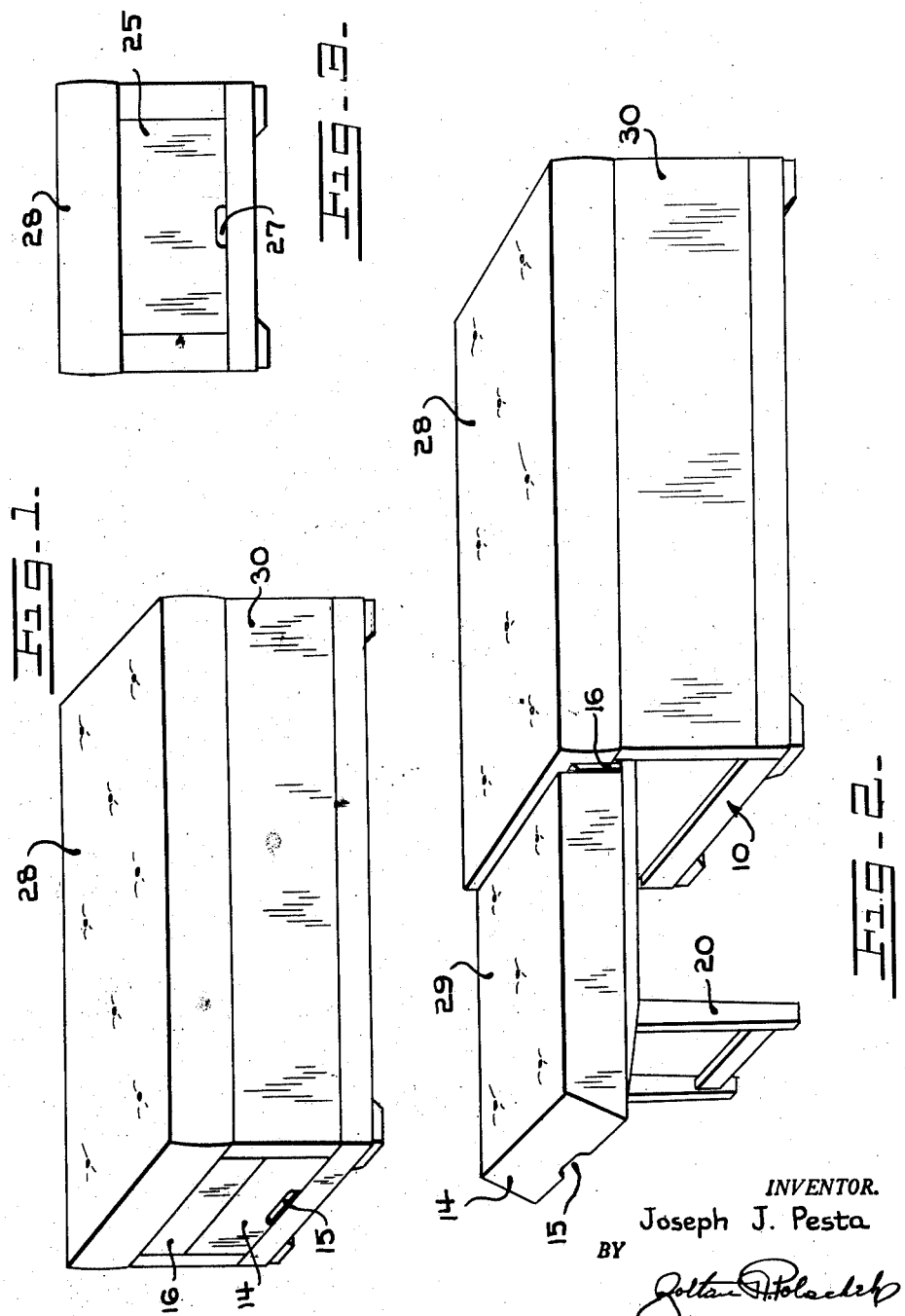
INVENTOR.
Joseph J. Pesta
BY
ATTORNEY.

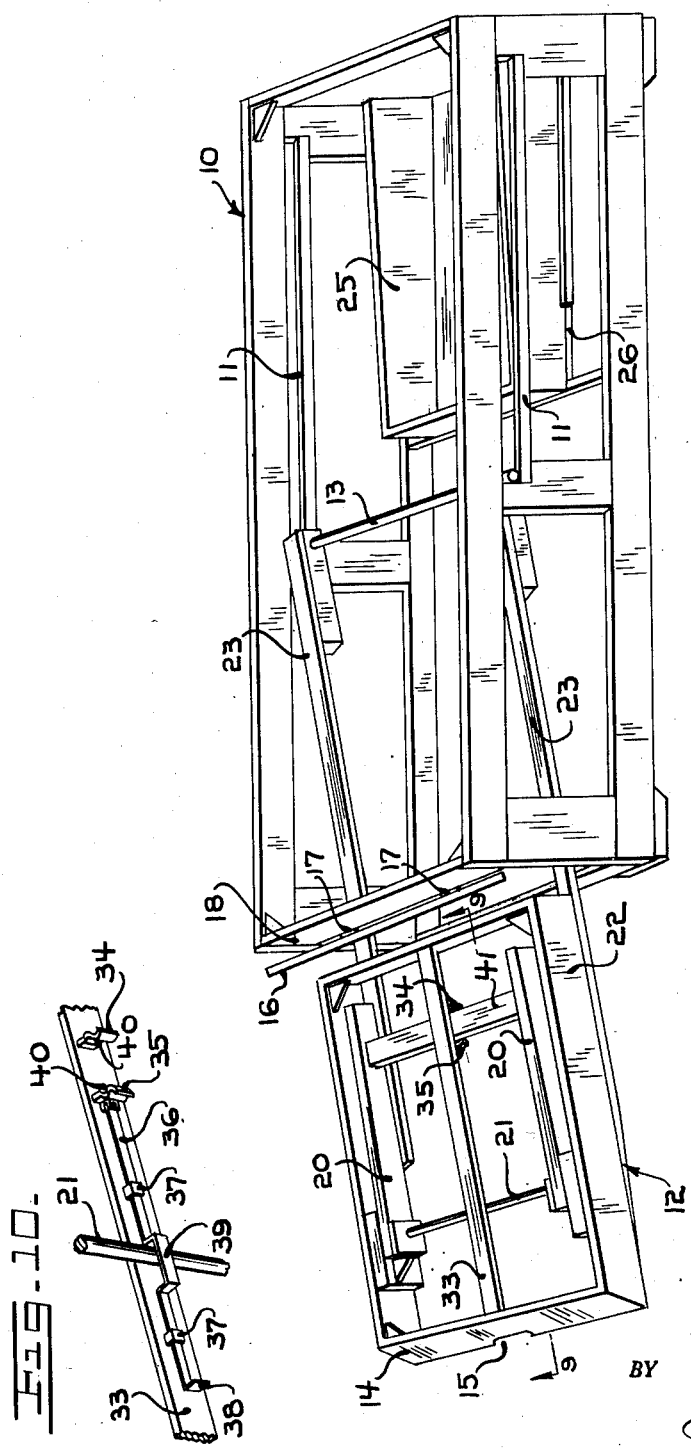

Nov. 22, 1949    J. J. PESTA    2,489,105
COMBINATION LOVE SEAT AND BED
Filed April 25, 1945    5 Sheets-Sheet 4
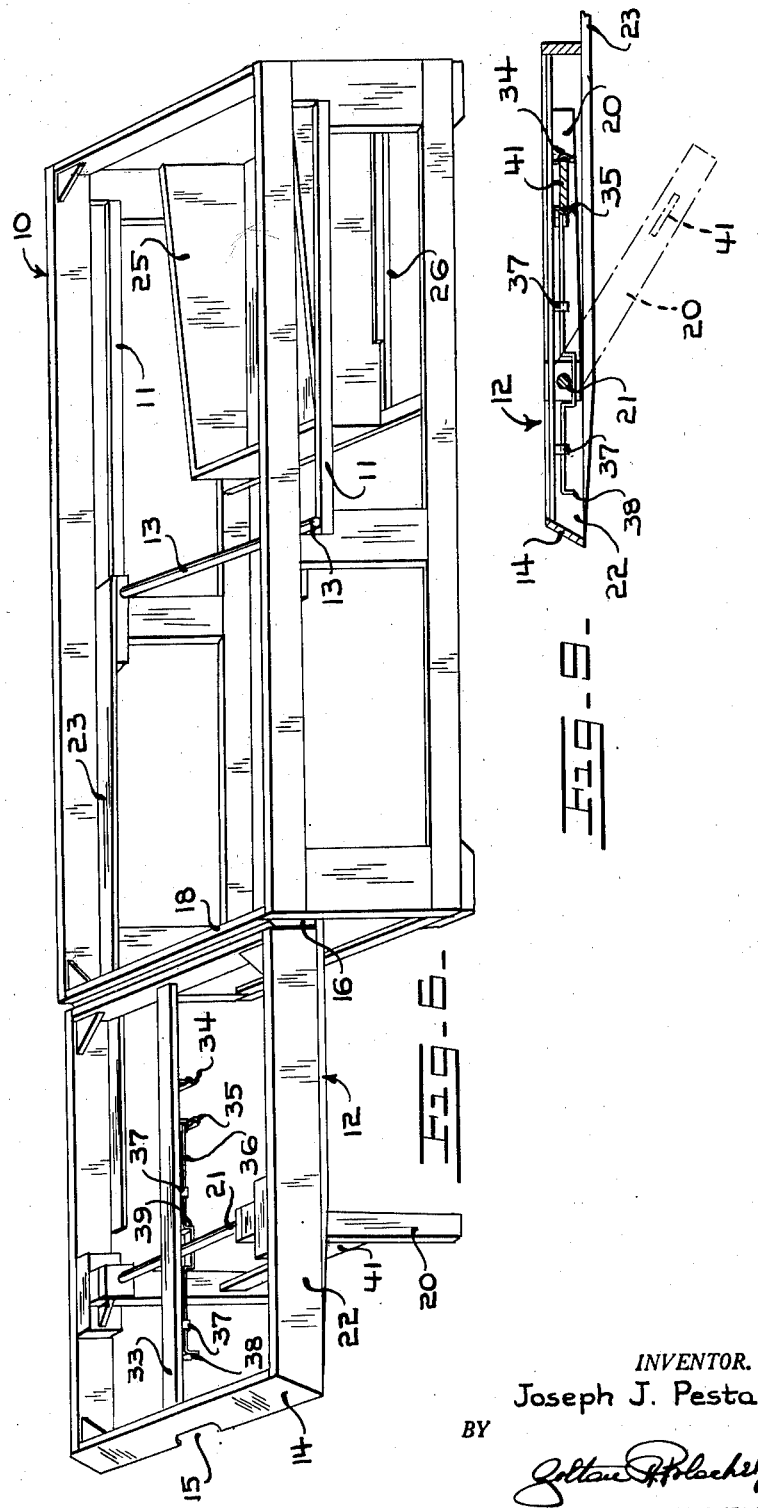
INVENTOR.
Joseph J. Pesta
BY
ATTORNEY.

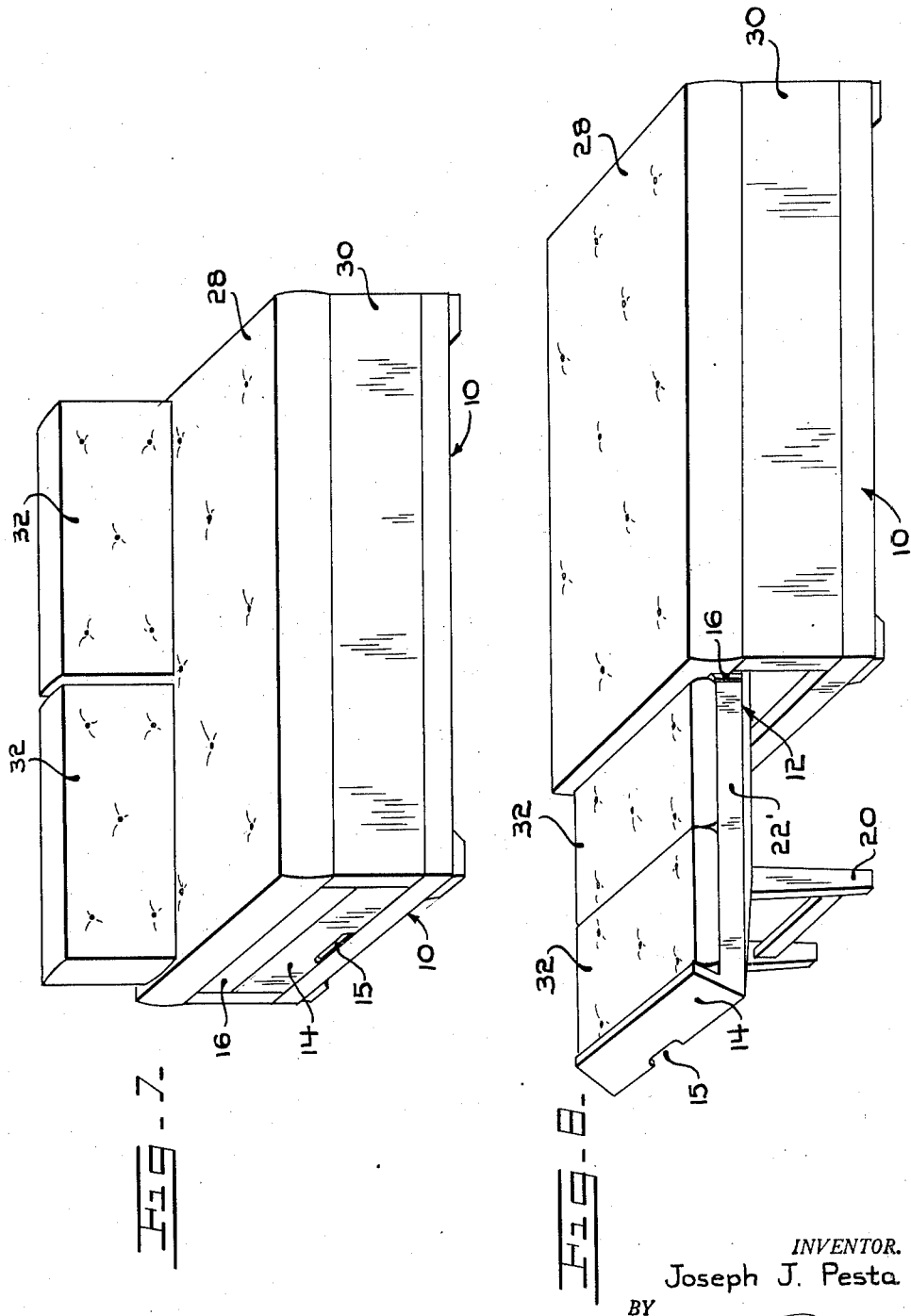

Patented Nov. 22, 1949

2,489,105

UNITED STATES PATENT OFFICE 2,489,105

COMBINATION LOVE SEAT AND BED

Joseph J. Pesta, New York, N. Y.

Application April 25, 1945, Serial No. 590,257

2 Claims. (Cl. 5—17)

This invention relates to new and useful improvements in a combination love seat and bed.

More particularly, the invention proposes a new and improved combination love seat and bed which is characterized by an extension frame obliquely disposed within a box-like frame and having its foot end slidably and pivotally mounted upon tracks mounted along the front portions of the sides of said box-like frame, and having its head end at the bottom portion of the foot of said box-like frame.

Still further the invention proposes that the head end of said extension frame simulate a drawer end at the bottom portion of the foot end of said box-like frame. It is proposed to provide a hingedly mounted panel at the top portion of the foot end of said box-like frame which is adapted to be folded upwards when said extension frame is extened to make room for the extension frame being lifted upwards. It is also proposed to provide foldable legs on the head end of the extension frame to support it in a raised position.

The invention also proposes that said various frames be provided with the usual upholstery, or other covering material. Cushions may also be provided.

Still further the invention contemplates the construction of a combination love seat and bed which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a perspective view of a combination love seat and bed constructed in accordance with this invention, and illustrated in a closed position.

Fig. 2 is a perspective view of the combination love seat and bed shown in Fig. 1 in an open position.

Fig. 3 is an end elevational view of Fig. 1 looking from the right hand end.

Fig. 5 is a perspective view of the parts shown in Fig. 4 with the extension frame pulled outwards.

Fig. 6 is a perspective view of the parts shown in Fig. 5 but with the extension frame in its raised position.

Fig. 7 is a perspective view of another combination love seat and bed embodying another form of this invention.

Fig. 8 is a perspective view of the combination love seat and bed shown in Fig. 7, but illustrated in an open condition.

Fig. 9 is a fragmentary longitudinal sectional view taken on the line 9—9 of Fig. 5.

Fig. 10 is a fragmentary perspective view illustrating the center longitudinal strip of the head end of the extension frame, viewed from the bottom.

Figure 4:
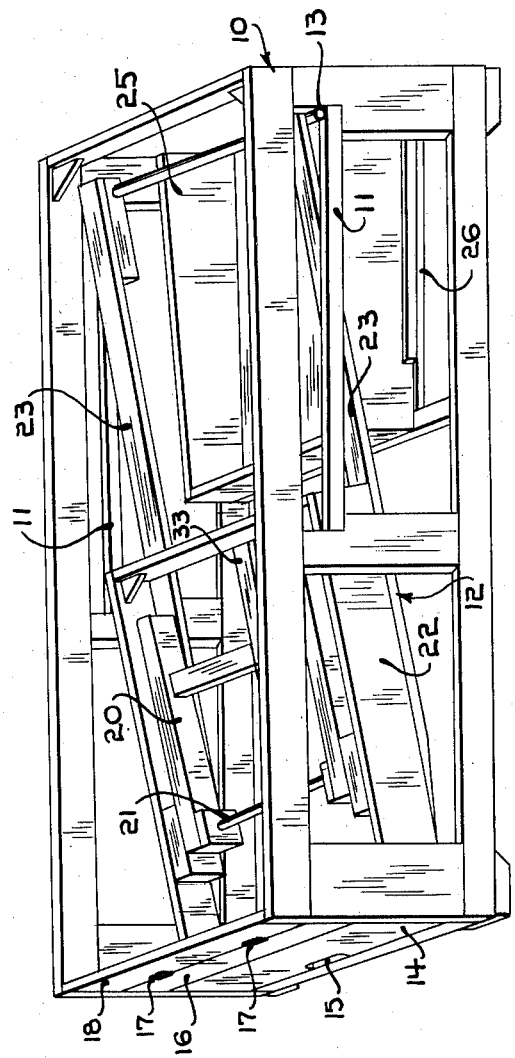
Fig. 4 is a perspective view of the combination love seat and bed in its closed position, but with all the upholstery and covering removed, so as to disclose the interior construction.

The combination love seat and bed, in accordance with that form of the invention illustrated in Figs. 1-6 inclusive, includes a box-like frame 10 preferably constructed of boards and provided with tracks 11 mounted along the top portions of the sides thereof. These tracks 11 extend along the foot end portion of the frame 10. An extension frame 12 is obliquely disposed within the box-like frame 10 and has its foot end slidably and pivotally mounted upon said tracks 11.

More particularly, a rod 13 is mounted through the foot end of the extension frame 12 and engages the tracks 11 by which the foot end of the frame slidably and pivotally mounted, as stated. The extension frame 12 has a head end 14 which simulates a drawer end. This head end 14 is located at the bottom portion of the head end of the box-like frame 10. The said head end 14 has a cutout 15 for the fingers to engage, by which it may be easily gripped so that the extension frame may be manually extended.

A hinged panel 16 is disposed at the top portion of the foot end of said box-like frame 10 and is adapted to be folded upwards. In its lowered position it engages against the top edge of the head end 14 and serves to close a portion of the head end of the box-like frame 10. The panel 16 is hingedly mounted by hinges 17 upon an end top board 18 contained at the head end of the box-like frame 10.

Foldable legs 20 are mounted on the head end of the extension frame 12. These foldable legs 20 are supported by a rod 21 so that the legs 20 may be pivoted upwards to assume a position within a portion of the extension frame 12, as for example illustrated in Figs. 4 and 5, or they may be pivoted downwards as illustrated in Figs. 2 and 6.

The head end of the extension frame 12 is provided with a box-like structure 22 within which the foldable legs 20 are mounted. This box-like structure 22 is supported upon side arms 23 which form the foot end portion of the extension frame 12.

The head end 14 of the extension frame 12 is provided with means for latching the foldable legs 20 in their folded positions. This means includes a longitudinally extending center strip 33 mounted upon the head end 14. A stationary jaw 34 is mounted upon the bottom of the strip 33 and is opposed to a movable jaw 35. This movable jaw 35 is supported upon a rod 36 which is slidably mounted through brackets 37 mounted upon the bottom face of the strip 33. The rod 36 is provided with an offset end 38 which is in the nature of a handle by which the rod 36 may be easily moved. The rod 36 has an offset portion 39 which extends around the rod 21 which supports the foldable legs 20. The clamp jaws 34 and 35 have opposed grooves 40 adapted to grip the edges of a transverse strip 41 mounted across the legs 20.

In Fig. 5 the foldable legs 20 are illustrated in their folded positions. The legs 20 may be released by gripping the handle portion 38 of the rod 36 and moving the jaw 35 away from the jaw 34. This frees the strip 41, so that the foldable legs 20 may now be pivoted downwards to their open positions shown in Fig. 6.

A foot end drawer 25 is engaged within the foot end of the box-like frame 10. This drawer 25 is slidably supported on tracks 26 mounted along the foot end portion of the box-like frame 10. The drawer 25 has a bottom front cutout 27 into which the fingers may be engaged for gripping the drawer so that it may be easily opened and closed. This drawer 25 may be used to store pillows for the love seat and bed, or for other articles.

The top of the box-like frame 10 is closed with suitable upholstery 28. The top of the box-like portion 22 of the extension frame 12 is closed with upholstery 29. The sides of the box-like frame 10 are closed with covering material 30, or may be constructed with a painted or finished wooden panel.

The operation of the combination love seat and bed may be understood from the following:

In Fig. 1 the love-seat and bed is illustrated in its closed position. It may be opened by engaging the fingers through the opening 15 of the head end 14 of the extension frame 12. Now the extension frame may be pulled and simultaneously the panel 16 is pivoted upwards to an open position. The extension frame 12 may be fully extended as illustrated in Fig. 5. Then it is lifted upwards to a position as illustrated in Fig. 6, and the foldable legs 20 are moved downwards into their open positions. The combination love seat and bed is now in the open condition illustrated in Fig. 2.

In Figs. 7 and 8 a modified form of the invention has been disclosed which is very similar to the prior form, distinguishing merely in the fact that two pillows 32 are provided for the back of the love seat and bed. The extension frame 12 has its head end formed with a relatively low box-like portion 22' so that there is sufficient room to place the pillows 32 thereon when the extension frame is extended. Fig. 8 illustrates the pillows 32 in position on the open love seat and bed.

In other respects this form of the invention is identical to the previous form and like parts are indicated by like reference numerals.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a combination love seat and bed, a box-like frame, tracks mounted along the top portions of the sides of said frame, an extension frame obliquely disposed within said box-like frame and having its foot end slidably and pivotally mounted upon said tracks and its head end simulating a drawer end and normally located at the bottom portion of the head end of said box-like frame, a hinged panel on the top portion of the foot end of said box-like frame and adapted to be folded upwards, foldable legs including lateral leg connecting rod and strip portions mounted on the head end of said extension frame, means for latching said foldable legs in folded positions including a center strip, a jaw piece fixed to said center strip, a rod movable longitudinally of said strip and shaped to provide a jaw portion, an overturned end portion constituting a handle, an offset section through which said leg rod extends and a movable jaw portion opposing said jaw piece, said rod being manually operable to close said jaws and hold the leg strip when the leg is folded.

2. In a combination love seat and bed, a box-like frame, tracks mounted along the top portions of the sides of said frame, an extension frame obliquely disposed within said box-like frame and having its foot end slidably and pivotally mounted upon said tracks and its head end simulating a drawer end and normally located at the bottom portion of the head end of said box-like frame, a hinged panel on the top portion of the foot end of said box-like frame and adapted to be folded upwards, and foldable legs mounted on the head end of said extension frame, and including a strip mounted upon the head end of said box-like frame, a stationary jaw on said strip, a movable jaw on a rod slidably mounted on said strip, and said foldable legs having a strip engageable between said jaws to be gripped and held by said jaws.

JOSEPH J. PESTA.

REFERENCES CITED

The following references are of record in the file of this patent:

UNITED STATES PATENTS

| Number | Name | Date |
|---|---|---|
| 9,083 | Walker | June 29, 1852 |
| 167,095 | Goss | Aug. 24, 1875 |
| 806,678 | Kelly | Dec. 5, 1905 |
| 917,184 | Tate | Apr. 6, 1909 |
| 1,684,936 | Allemeier | Sept. 18, 1928 |
| 1,723,235 | Hamilonoff | Aug. 6, 1929 |
| 2,164,438 | Woller | July 4, 1939 |

FOREIGN PATENTS

| Number | Country | Date |
|---|---|---|
| 5,266 | Sweden | July 7, 1894 |